2,979,546

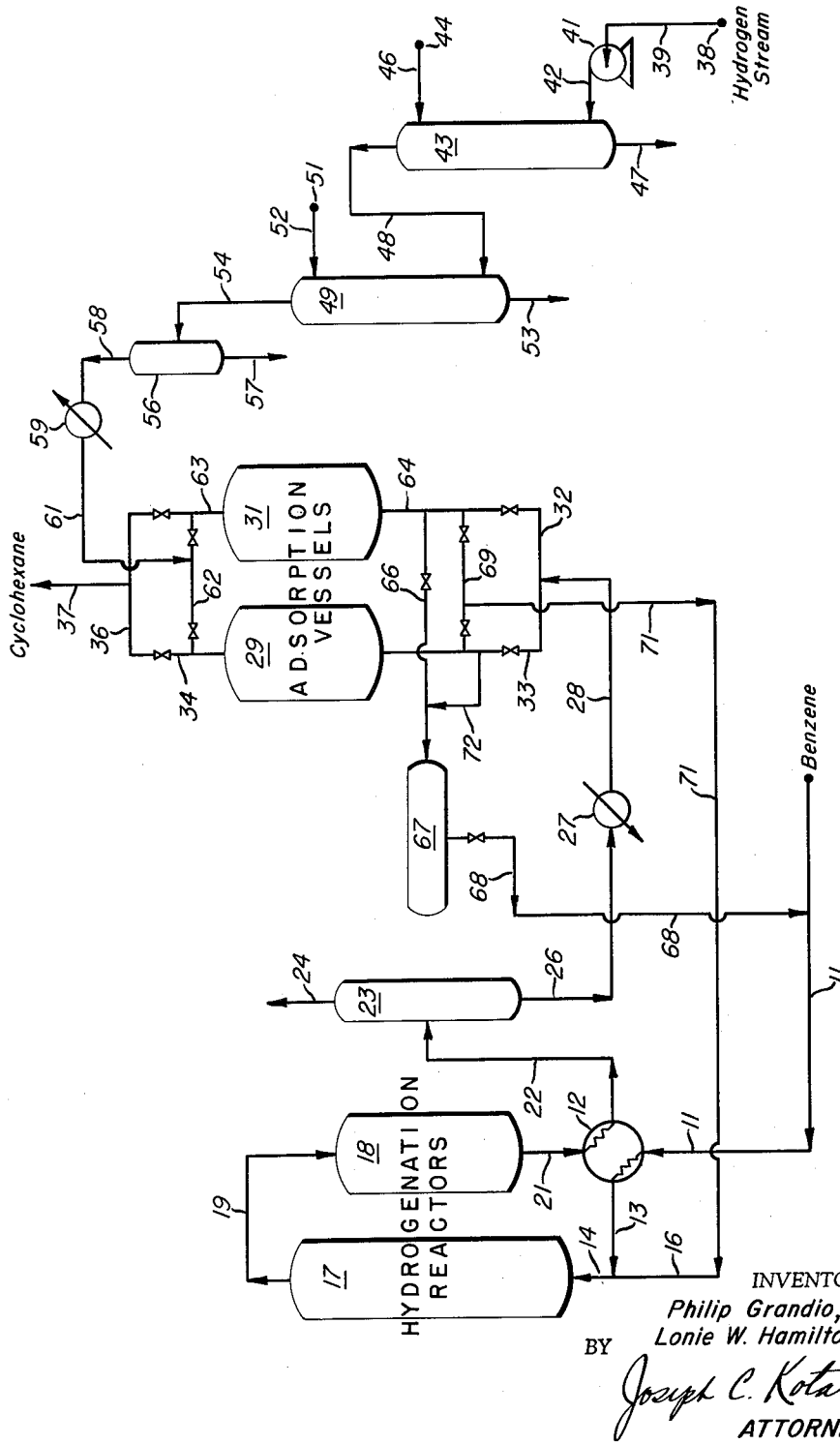
INVENTORS:
Philip Grandio, Jr.
Lonie W. Hamilton, Jr.
BY Joseph C. Kotarski
ATTORNEY 18 # United States Patent Office 2,979,546
Patented Apr. 11, 1961

MANUFACTURE OF CYCLOPARAFFIN HYDROCARBONS

Philip Grandio, Jr., Texas City, and Lonie W. Hamilton, Jr., La Marque, Tex., assignors, by mesne assignments, to Standard Oil Company, Chicago, Ill., a corporation of Indiana Filed July 16, 1958, Ser. No. 749,012

7 Claims. (Cl. 260—667)

This invention relates to the manufacture of cycloparaffin hydrocarbons such as cyclohexane, methyl cyclohexane and the like from the corresponding mononuclear aromatic hydrocarbon.

An object of the present invention is to provide a process for producing substantially pure cycloparaffin hydrocarbons from the corresponding mononuclear aromatic hydrocarbon e.g. the manufacture of cyclohexane of high purity from benzene. Another object is to provide a cycloparaffin hydrocarbon manufacturing process having a cycloparaffin purifying step which is integrated with the hydrogenation of mononuclear aromatics to the corresponding and desired cycloparaffin. A further object is to provide an integrated cycloparaffin hydrocarbon manufacturing process which requires minimized equipment for compression, pumping, and heating of the reactants. A specific object of the invention is to provide an integrated and efficient process for the manufacture of high purity cyclohexane from benzene. Other objects and advantages of the invention will be apparent from the detailed description thereof.

In accordance with the present invention a mononuclear aromatic hydrocarbon is hydrogenated to produce the corresponding cycloparaffin hydrocarbon therefrom. Thus benzene, toluene or the like is hydrogenated to cyclohexane or methyl cyclohexane, respectively. In commercial operation it is impossible or impractical to effect absolutely complete conversion of the aromatic hydrocarbon to its corresponding cycloparaffin. A minor amount of residual unconverted aromatic is present in the cycloparaffin product. This amount of residual aromatic in the cycloparaffin product may be as little as a fraction of 1% up to 5 to 10%, it generally being less than 1%. The products from the hydrogenation step are then separated into a gaseous stream and a liquid stream. The gaseous stream contains the excess hydrogen that was not consumed during the hydrogenation reaction and also contains hydrocarbons having a lower boiling point than the aromatic hydrocarbons subjected to hydrogenation. Small amounts of such hydrocarbons may have been formed during the hydrogenation reaction or may have been introduced into the hydrogenation reactor as impurities in the hydrogen stream employed therein. The liquid stream, which consists primarily of the cycloparaffin but contains a minor amount of residual or unconverted aromatics, is then passed to a cycloparaffin purification step. In this step a number of adsorption vessels, usually two are sufficient, which contains a silica gel adsorbent are used. The liquid stream is introduced into the first adsorption vessel and the silica gel selectively adsorbs the aromatic hydrocarbons from the cycloparaffins. This is continued until the silica gel in the first adsorption vessel becomes substantially spent for removing additional amounts of aromatics. Then the flow of the liquid stream into this first vessel is discontinued and the liquid stream is then passed into a second adsorption vessel wherein the liquid stream of cycloparaffins is purified of aromatics by the selective adsorbing action of fresh or regenerated silica gel. In the meantime the first adsorption vessel is being subjected to a regeneration step wherein hot hydrogen is employed to displace or desorb the aromatic from the silica gel. The desorbed aromatics and the desorbing hydrogen gas are then passed into the hydrogenation reaction zone into which additional amounts of the aromatic hydrocarbon are added for conversion to the cycloparaffins.

The hot hydrogen desorbing gas used for the regeneration of the spent silica gel may be introduced into the adsorption vessel at a temperature not lower than the temperature employed in the hydrogenation reaction zone. This avoids the need for additional heating of the hydrogen employed in the hydrogenation reaction zone. The hot hydrogen desorbing gas is introduced under pressure into the adsorption vessel being regenerated, and the pressure at which it is introduced may advantageously be sufficient as to avoid the need for further compression prior to introducing the hydrogen gas into the hydrogenation reaction zone. The hot hydrogen desorbing gas is even more advantageously employed under a pressure sufficient that no additional pumping equipment is necessary for moving the hydrogenation products, after passage through the hydrogenation reaction zone, through the remainder of the processing equipment employed for recovering the substantially pure cycloparaffin.

After the second of the adsorption vessels becomes spent for adsorbing further amounts of aromatics from the liquid stream rich in cycloparaffins, the flow to this second adsorption vessel is discontinued and the second adsorption vessel is subjected to a previously described regeneration technique. Thus when two adsorption vessels are employed alternately for the adsorption of the aromatic hydrocarbons from the cycloparaffin hydrocarbons, a cyclical operation may be employed in the cycloparaffin purification step i.e. the first adsorption vessel is used for adsorption while the second vessel is being regenerated and when the silica gel in the first vessel becomes substantially spent then the first vessel is regenerated and the second vessel is used for adsorption, the flows being switched as necessary and thereby providing a continuous purification of the desired cycloparaffin.

The figure shows in schematic form an embodiment of the present invention by which high purity cyclohexane e.g. 99.5+% purity, is produced from benzene.

In this embodiment benzene is passed by way of line 11 into heat exchanger 12 wherein it is heated to an elevated temperature. The benzene employed in this embodiment is of fairly high purity e.g. 99% pure benzene. While a benzene fraction of lower purity may be used, it should not contain any hydrocarbons therein (but cyclohexane may of course be tolerated therein) which cannot be separated by distillation or other suitable techniques from the cyclohexane produced. Thus hydrocarbons such as 2,2-dimethylpentane and 2,4-dimethylpentane should not be present in the benzene charge to the hydrogenation step since it boils so closely to cyclohexane and cannot be separated readily therefrom and will therefore result in a cyclohexane product of lesser purity. However butanes, butenes, octenes, xylenes, and similar materials which are rather easily separated by distillation from benzene and/or cyclohexane may be present in the charge stock to the hydrogenation step since they are easily separated from the cyclohexane either prior to or subsequent to the silica gel purification step. It may often be desirable to remove such easily separable hydrocarbons from the benzene prior to charging the benzene to the hydrogenation reactor.

The heated benzene is removed from heat exchanger 12 and passed by way of line 13 into line 14. Hot hydrogen is passed by way of line 16 into line 14. The mixture of heated benzene and hydrogen is then passed into the hydrogenation reaction zone. In the system shown in this embodiment, the hydrogenation reaction zone consists of two reactors 17 and 18 which are operated in series. Both of the reactors contain hydrogenation catalyst, a nickel on kieselguhr catalyst being employed in the vessels in this embodiment. Any catalyst effective for the hydrogenation of mononuclear aromatics to the corresponding cycloparaffin may be employed, this feature of the process being no part of the claimed invention. Thus hydrogenation catalysts containing metals (or the oxides thereof) of Groups IVA, VA, VIA, VIII, or mixtures thereof of the Mendeléeff Periodic Table may be employed. These may be used in a finely divided state either alone or contained on or within a supporting material which is usually of a high surface area such as clays, alumina, bauxite, etc. The particular hydrogenation conditions which are employed also do not constitute a part of the present invention. The reaction conditions should be such that a major proportion or substantially all of the benzene is hydrogenated to cyclohexane but not so severe as to cause destructive hydrogenation. Thus the temperature will usually be below 700° F. and may be as low as 150–250° F., the particular temperature being dependent to some extent upon the catalyst that is used. The temperatures frequently employed are in the neighborhood of 300–500° F. A superatmospheric pressure is employed in the reaction zones, this usually being within the range of 50 to 1500 p.s.i.g., but not such extreme pressures as to cause destructive hydrogenation to occur. Hydrogen should be introduced into the reaction vessels in an amount ordinarily in excess of that needed to hydrogenate all of the benzene to cyclohexane. Thus at least 3 mols of hydrogen up to as much as 50 mols of hydrogen or more per mole of benzene may be charged. Ordinarily from about 4500 or 5000 to about 15,000 s.c.f. of hydrogen per barrel of benzene charged is employed. A fixed, moving, or fluidized catalyst bed may be used in the hydrogenation reactors.

In the embodiment illustrated herein, the benzene and hydrogen are introduced into vessel 17 at a temperature of about 350° F. The hydrogen is introduced in an amount of about 5000 s.c.f. per barrel of benzene charged. A flow rate of from 0.1 to 1.0 lb. of benzene/hr./lb. of catalyst is used. Since the hydrogenation reaction is exothermic indirect heat exchange means (not shown herein) may be positioned within reactor 17 to maintain a substantially uniform temperature therein. The total reaction products are removed from vessel 17 at a temperature which is ± about 20° F. of the temperature at which the reactants are introduced into reactor 17. The total reaction products are removed from vessel 17 at a temperature of about 360° F. To avoid unduly expensive heat exchange equipment and to minimize costs, the conversion of benzene to cyclohexane in hydrogenation reactor 17 is restricted to about 90–95%.

The hydrogenation products are removed from vessel 17 and passed by way of line 19 into hydrogenation reactor 18. This vessel contains the same catalyst i.e. nickel on kieselguhr catalyst, employs approximately the same reactor pressure i.e. about 150–175 p.s.i.g., and also uses approximately the same space velocity i.e. about 0.1 to 1.0 lb. benzene/hr./lb. catalyst, as was employed in hydrogenation reactor 17. However, this reactor is operated as an adiabatic reactor whereas vessel 17 is operated essentially as an isothermal reactor. Essentially all of the remaining benzene is converted to cyclohexane in reactor 18. Less than 1% of the benzene originally charged is left unconverted. Reactor 18 can be operated as an adiabatic reactor because of the small amount of benzene which is diluted with such a large amount of cyclohexane that is charged to vessel 18 by way of line 19.

The total hydrogenation products are removed from reactor 18 at a temperature between 400 and 500° F. and passed by way of line 21 into heat exchanger 12 wherein they are heat exchanged with the benzene feed to reactor 17. The cooled hydrogenation products are then passed by way of line 22 into distillation tower 23 wherein a gaseous stream is separated from a liquid stream. The gaseous stream is removed overhead by way of line 24 and may be used as fuel gas. This stream consists of the remaining amount of hydrogen (that was not consumed in hydrogenating the benzene) and also hydrocarbons boiling below the boiling point of the aromatic hydrocarbon. The hydrocarbons in this gas stream consist of the methane, ethane, and propane which were introduced as impurities in the hydrogen gas stream employed in the hydrogenation reaction zone. A small amount of such hydrocarbons may also be formed during the hydrogenation reaction. The liquid bottoms stream is removed from distillation tower 23 by way of line 26. It consists of cyclohexane of about 99% purity and contains less than about 1% of benzene. Even this small amount of benzene is sufficient to make the cyclohexane unusable in many commercial applications, and it must therefore be purified to reduce its benzene content to as low a value as possible.

The liquid stream in line 26 is then passed through cooler 27, and then flows through line 28 into the cyclohexane purification stage. In purifying the cyclohexane, twin adsorbers 29 and 31 which contain a silica gel adsorbent are employed for removing benzene from the cyclohexane. The cyclohexane containing about 1% benzene is passed from line 28 into line 32 and then flows by way of line 33 into adsorption vessel 29. Conventional adsorption temperatures on the order of 50 to 200° F. are employed in the adsorption vessels. While silica gel is employed herein to adsorb the benzene selectively from the cyclohexane, it is within the scope of the present invention to use other adsorbent materials which carry out the same function and can be regenerated similarly to silica gel. The impure cyclohexane passes through the bed of adsorbent silica gel in vessel 29 and the benzene is removed from the cyclohexane. Purified cyclohexane is removed from vessel 29, passed by way of line 34 into line 36, and then passed by way of line 37 to storage. The purified cyclohexane will contain usually less than one-half percent of benzene, and the concentration of benzene in the cyclohexane will often only be a matter of hundredths of a percent.

During the time that adsorption vessel 29 is functioning to adsorb benzene from the impure cyclohexane, hydrogen is being passed through adsorption vessel 31 and then subsequently is passed into the hydrogenation reactors. In this embodiment a hydrogen stream produced by the hydroforming of a naphtha is employed. This hydrogen stream consists of about 80% hydrogen with the remainder being comprised of methane, ethane, propane and hydrogen sulfide. The hydrogen stream is passed from source 38 by way of line 39 into compressor 41 wherein it is pressured to about 150–250 p.s.i.g. (the hydrogen stream from hydroforming reactors is ordinarily available at the plant site at such pressures and compression may not be needed). The compressed hydrogen stream is then passed by way of line 42 into the bottom of caustic scrubber 43 wherein it is countercurrently washed with a stream of dilute caustic solution to remove hydrogen sulfide therefrom. The caustic solution is passed from source 44 by way of line 46 into the top of caustic scrubber 43. The contaminated caustic solution is removed from scrubber 43 by way of line 47 and this solution is disposed of. The hydrogen stream, now freed of hydrogen sulfide, is removed overhead and passed by way of line 48 into wash drum 49 wherein it is scrubbed with water to remove traces of caustic solution. Water from source 51 is passed by way of line 52 and descends through vessel 49 and is removed from the latter and discarded by way of line 53. The washed hydrogen stream is removed from vessel 49 and passed by way of line 54 into vessel 56 where entrained water is removed and discarded by way of line 57. The compressed and purified hydrogen gas stream is then passed by way of line 58 into heater 59 wherein its temperature is raised to about 250–400° F., e.g. about 350° F. in this embodiment. The heated hydrogen gas stream is passed by way of line 61 into line 62. From line 62 it flows by way of line 63 into adsorption vessel 31.

Adsorption vessel 31 contains silica gel having adsorbed benzene, said silica gel being substantially spent for the removal of additional amounts of benzene. The silica gel must consequently be regenerated. The hot hydrogen gas stream entering adsorption vessel 31 by way of line 63 removes liquid rich in benzene from adsorption vessel 31. This benzene-rich liquid is removed from vessel 31 by way of line 64 and is passed by way of line 66 into surge drum 67. The benzene-rich liquid in surge drum 67 may then be passed by way of line 68 into line 11 whereby it is introduced with the fresh benzene into hydrogenation reactor 17. As the silica gel is heated and the benzene is desorbed therefrom in the vapor state, the valve in line 66 is closed and the vapors of benzene together with the hydrogen desorbing gas flows from line 64 into line 69. It is then passed by way of line 71 into line 16 and thereafter passes into hydrogenation reactor 17.

Because the temperature of the hydrogen gas stream used in desorbing benzene from vessel 31 is not appreciably lower, i.e. not more than 20 to 40° lower, than the temperature employed in hydrogenation reactor 17 it is not necessary to further heat the hydrogen gas before introducing it into hydrogenation reactor 17. In other embodiments, one may wish to heat the desorbing hydrogen gas to a somewhat lower temperature than that employed in the hydrogenation reaction zone while still using a temperature sufficiently high to desorb adsorbed benzene from the adsorbent. Still others may wish to heat the hydrogen desorbing gas to a temperature somewhat higher than that employed in the hydrogenation reaction zone. By using the hydrogen desorption technique, the desorption temperature may be lower than that needed with other desorbing materials. The use of hydrogen as the desorbing gas has further advantages over using an extraneous desorbing material. If an extraneous desorbing material, e.g. polar materials such as methanol, ethanol, etc. is used then it must be removed from the adsorbent before the adsorbent can again be contacted with the impure cyclhohexane and the desorbed benzene must also be separated from the extraneous desorbing agent. This would involve additional equipment and costs. The pressurized hot hydrogen desorbing gas is under sufficient pressure that it need not be further compressed prior to introduction into the hydrogenation reactors, and the hydrogenation reaction products need not be pumped (after their exit from the hydrogenation reactors) through the hydrogen-cyclohexane separation tower and the adsorption vessel.

After the silica gel in adsorption vessel 29 is no longer capable of removing substantial amounts of aromatics from the cyclohexane, the flow of the impure cyclohexane into line 33 is shut off and the flow of hot hydrogen desorbing gas into line 63 is shut off. The impure liquid cyclohexane stream is passed through line 64 into adsorption vessel 31 which contains regenerated silica gel. The purified cyclohexane is removed from this vessel by way of line 63, passed into line 36 and is then removed and passed to storage by way of line 37. After shutting off the flow of hot hydrogen desorbing gas into line 63, the hot hydrogen desorbing gas passes through line 62 into line 34 and then enters adsorption vessel 29 which contains the spent silica gel adsorbent. The benzene-rich liquid passes from vessel 29 by way of line 33 into line 72 by which it is passed into surge drum 67 and thereafter introduced into the hydrogenation reactors. Thereafter the benzene vapors and hot hydrogen desorbing gas are passed by way of line 33 into line 69 and then passed by way of line 71 and subsequent lines into the hydrogenation reactor vessel 17. Thus the adsorption vessels 29 and 31 are alternately being used for adsorption and regeneration, the flow of impure cyclohexane stream and the hot hydrogen desorbing gas being switched as necessary in this cyclical operating method. More than two adsorption vessels may be employed if desired, and one or more of the vessels may be undergoing regeneration while the others are being used for adsorption.

The invention has been described with reference to the manufacture of cyclohexane from benzene, but it is to be understood that methyl cyclohexane may be so prepared from toluene, dimethyl cyclohexane may be prepared from xylenes, trimethyl cyclohexane may be prepared from trimethylbenzenes, ethyl cyclohexane may be prepared from ethylbenzene, and various other polyalkyl cyclohexanes having from 1 to 5 alkyl side chains may be prepared from the corresponding alkylbenzenes and are to be understood as coming within the scope of this invention.

What is claimed is:

1. A process for the manufacture of a cyclohexane by the hydrogenation of a benzene hydrocarbon selected from the class consisting of benzene, toluene, ethylbenzene, and xylene, which process comprises (a) contacting said benzene hydrocarbon with hydrogen, in the presence of a hydrogenation catalyst, at a temperature between about 150° and 700° F. and a pressure from about 50 to 1500 p.s.i.g., said hydrogen being present in an amount from 3 to 50 mols per mol of benzene hydrocarbon charged, and continuing the hydrogenation reaction until only a minor amount of said benzene hydrocarbon remains unconverted, (b) removing the hydrogenation products from said hydrogenation reaction zone, (c) separating said hydrogenation products into a gaseous stream which contains hydrogen and hydrocarbons boiling below the boiling point of the feed benzene hydrocarbon, and a liquid stream consisting of on the order of at least 90% of cycloparaffins produced by said hydrogenation reaction and a minor amount of unconverted benzene hydrocarbon, (d) passing said liquid stream into an adsorption vessel containing silica gel as the sole adsorbent, wherein benzene hydrocarbon is selectively adsorbed from said liquid stream at a temperature on the order of 50° to 200° F. and continuing introduction of said liquid stream into and withdrawal of a substantially pure cycloparaffin stream from said adsorption vessel until said silica gel adsorbent has become substantially spent for the adsorption of benzene hydrocarbon, at which time the introduction of the liquid stream into said adsorption vessel is stopped, (e) regenerating said silica gel adsorbent by passing through said adsorbent a hydrogen stream, at a temperature on the order of the temperature utilized in said hydrogenation zone, and continuing passage of said hydrogen stream until essentially all of said adsorbed benzene hydrocarbon has been desorbed and has been removed from said adsorption vessel by the exiting hydrogen gas stream, (f) cycling said desorbed benzene hydrocarbon and said desorbing hydrogen gas to said hydrogenation zone, and (g) utilizing said regenerated silica gel adsorbent for removal of further amounts of benzene hydrocarbon from said liquid stream.

2. The process of claim 1 wherein two adsorption vessels are employed in cyclical operation, the first adsorption vessel being used to adsorb benzene hydrocarbon while the second adsorption vessel is being regenerated for subsequent adsorption use, and then switching the flow of the liquid stream and the hydrogen desorbing gas so that the second adsorption vessel is used to adsorb benzene hydrocarbon while the first adsorption vessel is being regenerated for subsequent adsorption use.

3. The process of claim 1 wherein said benzene hydrocarbon is benzene.

4. The process of claim 1 wherein said hydrogenation temperature is in the neighborhood of 300°–500° F.

5. A continuous process for the manufacture of cyclohexane, which process comprises (1) contacting benzene with hydrogen in a first hydrogenation zone, in the presence of a hydrogenation catalyst, at a temperature between about 150° F. and 700° F. and a pressure from about 50 to 1500 p.s.i.g., said hydrogen being present in an amount from about 4,500 to 15,000 s.c.f. per barrel of benzene charged and continuing the hydrogenation reaction until about 90–95% of said benzene is converted to cyclohexane, said first hydrogenation zone being maintained in an essentially isothermal condition with the hydrogenation product exit temperature being within about 20° F. of the reactant introduction temperature, (2) passing the first hydrogenation product stream removed from said first hydrogenation zone to a second hydrogenation zone and continuing the hydrogenation reaction, in the presence of a hydrogenation catalyst, at a temperature between about 150° and 700° F. and a pressure from about 50 to 1500 p.s.i.g., under adiabatic conditions, until the overall conversion of benzene to cyclohexane is about 99%, (3) removing the hydrogenation products from said second hydrogenation reaction zone, (4) separating said second hydrogenation products into a gaseous stream which contains hydrogen and hydrocarbons boiling below the boiling point of benzene, and a liquid stream consisting of on the order of 99% of cyclohexane and on the order of 1% of unconverted benzene, (5) passing said liquid stream into a first adsorption vessel containing silica gel adsorbent, wherein benzene is selectively adsorbed from said liquid stream at a temperature on the order of 50° to 200° F. and continuing introduction of said liquid stream into and withdrawal of a product stream containing at least about 99.5% cyclohexane from said first adsorption vessel until said silica gel as the sole adsorbent has become substantially spent for the adsorption of benzene, at which time the introduction of the liquid stream into said first adsorption vessel is stopped, (6) then introducing said liquid stream into another adsorption vessel containing silica gel as the sole adsorbent, wherein benzene is selectively adsorbed from said liquid stream at a temperature on the order of 50° to 200° F. and continuing introduction of said liquid stream into and withdrawal of at least 99.5% cyclohexane stream from said other adsorption vessel until the silica gel adsorbent therein has become substantially spent for the adsorption of benzene, at which time the introduction of the liquid stream into said other adsorption vessel is stopped, (7) regenerating said silica gel adsorbent in said first adsorption vessel by passing through said adsorbent a hydrogen stream, at a temperature on the order of the temperature utilized in said hydrogenation zone, and continuing passage of said hydrogen stream until essentially all of said adsorbed benzene has been desorbed and has been removed from said first adsorption vessel by the exiting hydrogen gas stream, (8) cycling said desorbed benzene hydrocarbon and said desorbing hydrogen gas to said first hydrogenation zone, (9) utilizing said regenerated silica gel adsorbent for removal of further amounts of benzene from said liquid stream, when said other absorption vessel has become spent for the removal of benzene and (10) continuing this cyclic adsorption-regeneration procedure to obtain continuous operation of said process.

6. The process of claim 5 wherein said first and said second hydrogenation zones are operated at a temperature from about 300°–500° F. and at a pressure from about 150 to 175 p.s.i.g.

7. The process of claim 5 wherein said hydrogen containing gaseous stream is separated from said liquid stream at a pressure such that said gaseous stream need not be compressed prior to introduction to said first hydrogenation zone and pumping is not needed for movement of the total hydrogenation zone products through the remainder of the process.

References Cited in the file of this patent

UNITED STATES PATENTS

| | | |
|---|---|---|
| 2,328,828 | Marschner | Sept. 7, 1943 |
| 2,395,491 | Mavity | Feb. 26, 1946 |
| 2,515,279 | Van Der Hoeven | July 18, 1950 |
| 2,571,936 | Patterson | Oct. 16, 1951 |
| 2,586,535 | Ipatieff et al. | Feb. 19, 1952 |
| 2,719,206 | Gilmore | Sept. 27, 1955 |
| 2,755,317 | Kassel | July 17, 1956 |
| 2,821,561 | Pevere et al. | Jan. 28, 1958 |
| 2,834,429 | Kinsella et al. | May 13, 1958 |
| 2,848,384 | Fear | Aug. 19, 1958 |